US008779617B2

(12) United States Patent
Egedal et al.

(10) Patent No.: US 8,779,617 B2
(45) Date of Patent: Jul. 15, 2014

(54) METHOD FOR REDUCING VIBRATIONS OF A WIND TURBINE AND CONTROL SYSTEM FOR REDUCING VIBRATIONS

(75) Inventors: Per Egedal, Herning (DK); Dennis Soebye Jensen, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 13/306,059

(22) Filed: Nov. 29, 2011

(65) Prior Publication Data

US 2012/0146331 A1 Jun. 14, 2012

(30) Foreign Application Priority Data

Dec. 8, 2010 (EP) .................................. 10194150

(51) Int. Cl.
*F03D 9/00* (2006.01)
(52) U.S. Cl.
USPC ............................................................ 290/55
(58) Field of Classification Search
USPC .................................... 290/54–55; 416/43
See application file for complete search history.

(56) References Cited

U.S. PATENT DOCUMENTS

| 7,942,629 | B2 * | 5/2011 | Shi et al. .................... 415/119 |
| 2009/0149999 | A1 * | 6/2009 | Schramm et al. ............ 700/280 |
| 2009/0263245 | A1 * | 10/2009 | Shi et al. .......................... 416/43 |
| 2011/0018268 | A1 * | 1/2011 | Snel et al. ........................ 290/44 |
| 2011/0123331 | A1 * | 5/2011 | Stiesdal ............................ 416/1 |
| 2011/0142596 | A1 * | 6/2011 | Nies ................................ 415/13 |
| 2012/0104754 | A1 * | 5/2012 | Rudolf et al. .................... 290/44 |
| 2012/0139240 | A1 * | 6/2012 | Otamendi Claramunt et al. ............................. 290/44 |
| 2012/0161443 | A1 * | 6/2012 | Moser et al. .................... 290/44 |
| 2013/0110414 | A1 * | 5/2013 | Caponetti et al. ............... 702/35 |
| 2013/0195654 | A1 * | 8/2013 | Berger et al. ..................... 416/1 |
| 2013/0209254 | A1 * | 8/2013 | Hess et al. ........................ 416/1 |

FOREIGN PATENT DOCUMENTS

| EP | 2107236 A1 | 10/2009 |
| EP | 2123906 A1 | 11/2009 |
| EP | 2146093 A1 | 1/2010 |
| WO | WO 2007089136 A2 | 8/2007 |
| WO | WO 2008067814 A2 | 6/2008 |

* cited by examiner

*Primary Examiner* — Truc Nguyen

(57) ABSTRACT

A method for reducing vibrations of a wind turbine includes a plurality of set points characterizing set values of operation parameters of the wind turbine. The method includes measuring an acceleration force value corresponding to acceleration forces acting on the turbine, and determining whether the measured acceleration force value is above a predetermined threshold value. Furthermore, in case it is determined that the acceleration force value is above the predetermined threshold value, the set point value of at least one set point of the plurality of set points is modified in order to reduce the vibrations in such a way that a power output of the wind turbine is not reduced.

7 Claims, 3 Drawing Sheets

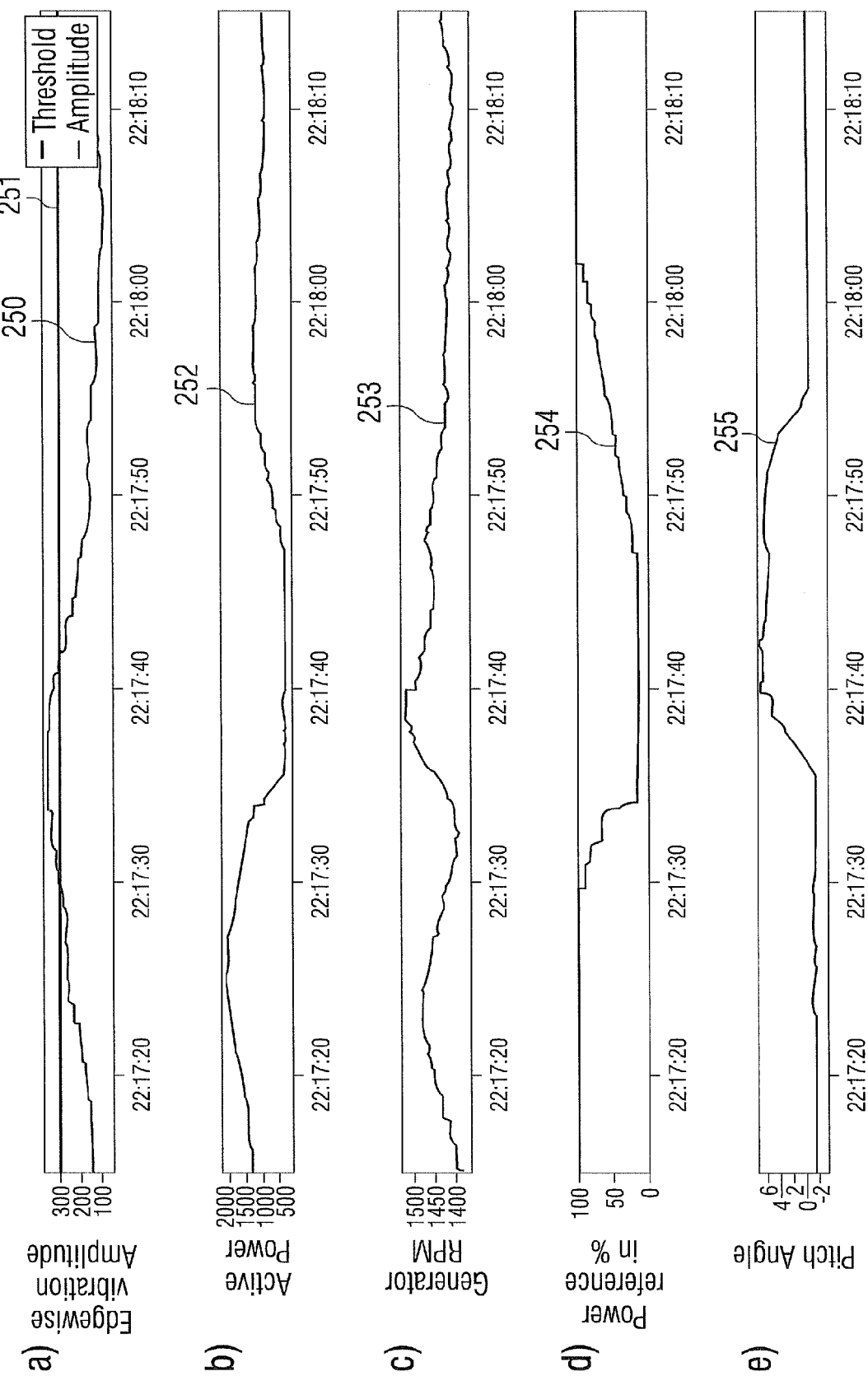

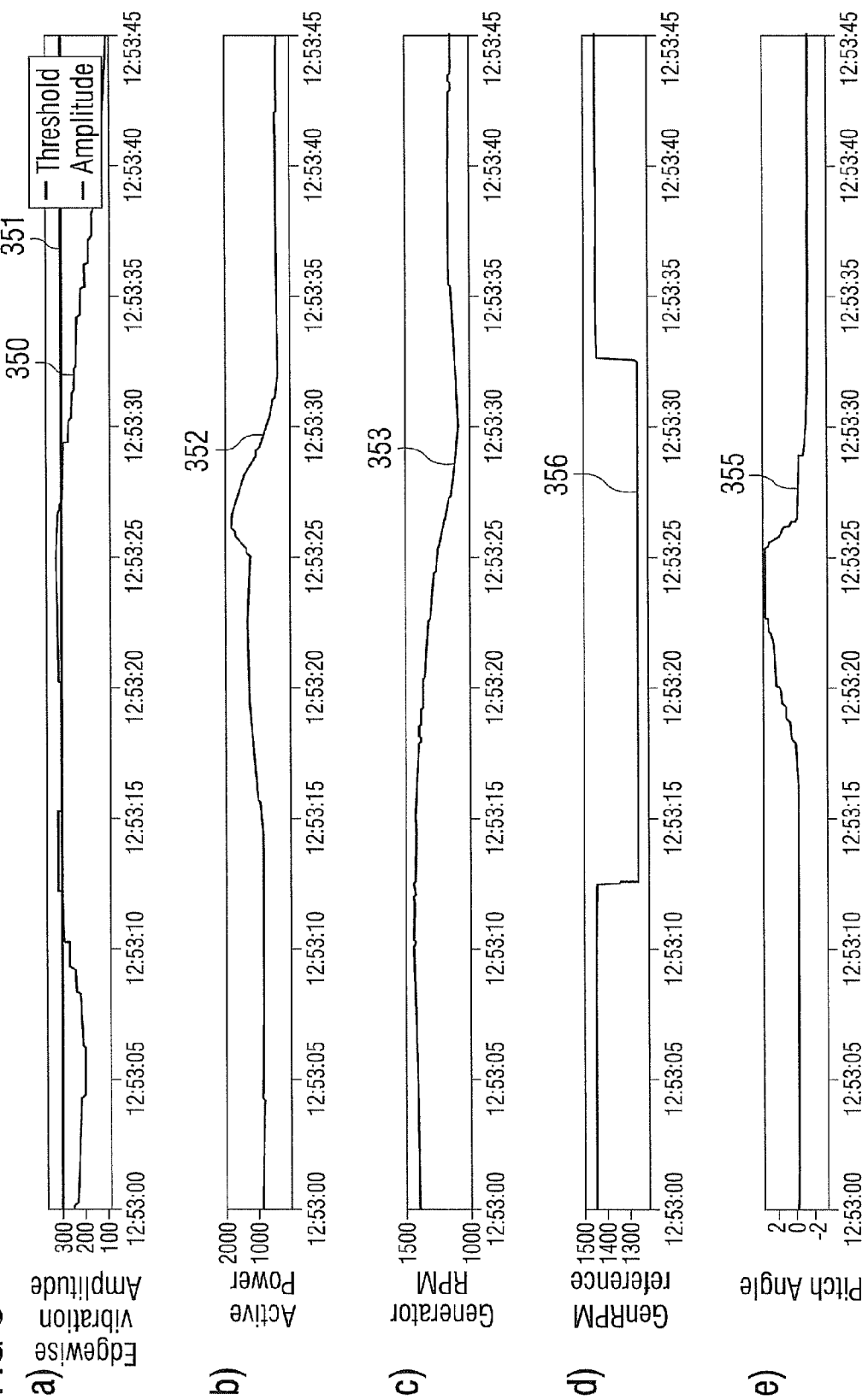

METHOD FOR REDUCING VIBRATIONS OF A WIND TURBINE AND CONTROL SYSTEM FOR REDUCING VIBRATIONS

CROSS REFERENCE TO RELATED APPLICATIONS

This application claims priority of European Patent Office Application No. 10194150.8 EP filed Dec. 8, 2010, which is incorporated by reference herein in its entirety.

FIELD OF THE INVENTION

The present invention relates to the field of wind turbines for generating electric power. In particular, the present invention relates to a method and to a control system for reducing vibrations of blades of a wind turbine or the turbine itself. Further, the present invention relates to a wind turbine and to a computer program for controlling the above mentioned method for reducing vibrations of blades of a wind turbine.

ART BACKGROUND

Wind energy is increasingly recognized as a viable option for complementing and even replacing other types of energy sources such as for instance fossil fuels. In the early development of wind energy, the majority of wind turbines were constructed for operation at a constant speed. However, recently the trend is toward using variable-speed wind turbines to better capture available wind power. In most cases, wind turbine blade pitch angles can be adjusted to control the operation of the variable speed wind turbine. However, during certain wind conditions like wake, wind shear, high turbulence or ice on the blades it can cause high vibrations on the turbine r the blades. The vibration level may be monitored by G-sensors and when reaching high vibrations the turbine will be affected by larger forces and it will wear down much faster.

SUMMARY

Thus, there may be a need to provide a method which dealing with a way to dampen vibrations of the blades and/or the turbine to avoid damaging the turbine.

This need may be met by the subject matter according to the independent claims. Advantageous embodiments are described by the dependent claims.

According to an exemplary aspect, a method for reducing vibrations of a wind turbine having a plurality of set points characterizing the set values of operation parameters of the wind turbine is provided, wherein the method comprises measuring an acceleration force value corresponding to acceleration forces acting on the wind turbine, and determining whether the measured acceleration force value is above a predetermined threshold value. Furthermore, in case it is determined that the acceleration force value is above the predetermined threshold value the set point value of at least one set point of the plurality of set points is modified to reduce the vibrations while the power output of the wind turbine is not reduced. In particular, the power output, e.g. the electrical power output of the wind turbine may be increased. Furthermore, the vibrations which are reduced may be edgewise blade vibrations. The respective value of the acceleration force may be measured by a sensor, e.g. a G-force sensor, which may be attached or fixed to the blades of the wind turbine or to a shaft of the turbine, e.g. in the nacelle, which is driven by the blades. A suitable threshold limit for the acceleration force may be in the interval between 1 g, i.e. one time the gravity force, and 3 g, for example. In particular, a suitable threshold limit may be in the interval between 1.2 g and 2.5 g, more particularly between 1.2 g and 2 g, e.g. 1.5 g, 1.75 g or 2 g. For example, the respective g-forces may be measured directly by strain gauges fixed to the blades or may be determined, calculated or estimated by the measured values of g-sensors fixed to the turbine, e.g. the tower of the wind turbine or which is arranged or fixed in the nacelle, from which measured values the edgewise vibration amplitude may be derivable which corresponds to a specific g-force acting on the blades.

According to an exemplary aspect, a control system for reducing vibrations of a wind turbine is provided, wherein the control system comprises a measuring unit adapted to measuring an acceleration force value corresponding to acceleration forces acting on the turbine, and a determining unit adapted to determine whether the measured acceleration force value is above a predetermined threshold value. Furthermore, the control system comprises a control unit adapted to modify the set point value of at least one set point of the plurality of set points in case it is determined that the acceleration force value is above the predetermined threshold value, wherein the modifying is performed in such a way that the vibrations are reduced while a power output of the wind turbine is not reduced.

The described control system may be realized by a computer program respectively by software. However, the control system may also be realized by one or more specific electronic circuits respectively hardware. Furthermore, the control system may also be realized in a hybrid form, i.e. in a combination of software modules and hardware modules.

According to an exemplary aspect, a wind turbine for generating electric power is provided, wherein the wind turbine comprises a tower, a rotor, which is arranged at a top portion of the tower and which comprises at least one blade, wherein the rotor is rotatable around a rotational axis or shaft and the at least one blade extends radial with respect to the rotational axis. Furthermore, the wind turbine comprises a generator being mechanically coupled with the rotor, and a control system according to an exemplary aspect. In particular, the wind turbine may further comprise a frequency converter adapted to be controlled by the control system in such a way to control, e.g. increase or decrease, the power output of the wind turbine.

According to a further aspect, a computer program for reducing vibrations is provided, which when being executed by a processing unit, is adapted for controlling a method according to an exemplary aspect.

As used herein, reference to a computer program is intended to be equivalent to a reference to a program element and/or to a computer readable medium containing instructions for controlling a computer system to coordinate the performance of the method for reducing vibrations according to an exemplary aspect. The computer program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

By providing the method according to an exemplary aspect it may be possible to provide a way of reducing or damping vibrations of the blades, e.g. edgewise blade vibrations, or of the generator or turbine shaft to possibly avoid damaging the turbine without unnecessarily loosing power production of the wind turbine. For example, edgewise vibrations of the blades may be monitored by one or more G-sensors. These edgewise vibrations may increase or build up over time, and when they reach a critical level, e.g. the respective acceleration forces reach a predetermined threshold value, a control system or monitoring system may start altering values of set or reference points of the turbine.

A gist of an exemplary aspect may be to provide a control method for a wind turbine which instead of decreasing the power output increases or at least maintains the power output of the wind turbine constant when reducing vibrations of the blades or the turbine. The controlling may be performed by a control system or control element which may be implemented by a processor or processing unit, e.g. implemented in a computer. By increasing the power output, e.g. by reducing a set point value for a rotational speed of the generator, it may be possible to reduce or remove vibrations, e.g. edgewise blade vibrations, while not reducing the power output.

Next, further embodiments of the method for reducing vibrations are described. However the respective features may also be combined with the control unit, the wind turbine or the computer program.

According to an exemplary embodiment of the method, the modified set point value is a set point of the power output. That is, the set point which is modified may be the set point corresponding or associated with the power output parameter of the wind turbine. In particular, the set point value of the power output may be set to a value corresponding to a higher power output. Thus, the power output may be even increased while reducing the vibrations of the turbine or edgewise blade vibrations. The additional electrical energy corresponding to the power output may be generated from the rotational energy stored in the rotation of the blades or of the generator so that the rotational speed and the vibrations may be reduced. The set point of the power output may control the operation of a frequency converter or an AC to AC converter of the wind turbine.

According to an exemplary embodiment of the method, the modifying of the set point value includes a reducing of the set point value of a generator rotational speed.

In particular, the set point value of the rotational speed may be reduced from a higher value to a lower value, i.e. the set point value of the generator speed parameter may be reduced. For example the rotational speed value of the generator may be reduced by 200 rounds per minute (RPM), e.g. from 1450 to 1250 RPM, or any other suitable value. In principle every reduction is possible which is suitable to reduce the vibrations even a less pronounced reduction, e.g. a reduction by 150 RPM or even by only 100 RPM or less. Of course also a higher reduction, e.g. by 250 RPM or 300 RPM or even more may be used. In general, the reducing of the setting of the generator rotational speed set point may, while reducing vibrations, give the turbine a higher active power output than common known methods for reducing vibrations. Already a slight reducing of the set point value of the rotational generator speed may effectively reduce or remove the vibrations while increasing the power output of the wind turbine by transforming the rotational generator speed or the rotation energy of the blades into electrical power. Additional the reducing of the rotational generator speed may reduce the risk of damaging the wind turbine by overspeed when high vibrations occur, since the method relies on reducing the rotational speed instead of increasing it as known in the prior art.

According to an exemplary embodiment of the method, the parameter the set point of which is modified is at least one out of the group consisting of: the pitch angle, the rotational speed of the generator, the rotational speed of the blades, the torque, and the power output of the wind turbine.

In particular, the torque the set point of which is changed or modified may be the torque imposed by the wind blades on a shaft of the wind turbine or the torque imposed by the shaft of the wind onto the generator. In other words the torque may be the torque of the main shaft of the wind turbine.

According to an exemplary embodiment, the method further comprises determining whether a rotational speed of a generator of the wind turbine is below a first predetermined threshold, and in case it is determined that the rotational speed is below the first predetermined threshold, increasing a set point of the rotational speed of the generator.

According to an exemplary embodiment the method further comprises determining whether a rotational speed of a generator of the wind turbine is above a second predetermined threshold, and in case it is determined that the rotational speed is below the second predetermined threshold, decreasing the set point of the rotational speed of the generator. The second predetermined threshold may correspond to a nominal reference value of the generator rotational speed, which may be in the range of 1000 RPM to 2000 RPM, more particularly in the range of 1200 RPM to 1700 RPM, e.g. about 1400 RPM, 1450 RPM or 1500 RPM. For example, in case the nominal generator rotational speed is about 1450 RPM, the set point may be reduced to values between about 500 RPM to 800 RPM, in particular to about 600 RPM to 700 RPM.

However, in case the generator rotational speed is already low, e.g. below the second threshold value, when high edgewise vibrations occur, i.e. vibrations or acceleration forces exceeding the respective threshold value, a set point value for the pitch angle may be altered or modified, so that the vibrations may be reduced. In principle the pitch angle may be changed by any degree, i.e. between $-90°$ and $+90°$. However, typically the changing of the pitch angle will be limited to the necessary amount to effectively reduce the vibration. In general, a change in the pitch angle between $-15°$ and $+15°$ may be sufficient. Suitable intervals may be as well between $-7.5°$ and $-2.5°$, between $2.5°$ and $7.5°$, more particular between $-6°$ and $-4°$, or between $4°$ and $6°$, e.g. $-5°$, $5°$ or about $5°$.

It should be noted that the set values of more that one of these parameters may be changed or modified in order to reduce the vibrations. For example, according to one embodiment the power output may be increased when a vibration reaches a certain level and the generator RPM of the turbine may be lowered. This may cause a peak in power production, since more torque is generated to slow down the turbine by drawing additional power. The pitch angle may also be changed when using this method or scheme to more quickly slow down the generator RPM, by adding a small offset to the pitch angle at high vibrations.

Alternatively, according to one embodiment a method may be provided which combines more of the turbine's set points to be dependent on each other. For example, if the generator speed is above a respective threshold when a high vibration occurs, the generator speed reference may be lowered to remove the vibration. But if the generator speed is below respective threshold when a high vibration occurs either the pitch angle is increased or the power is ramped down to remove the vibration.

The values of all these parameters may be measured or determined by appropriate sensors. In particular, the path of movement or acceleration acting on the wind turbine or the blades thereof may be determined by one or more appropriate acceleration sensors, which are attached in particular at the top portion of the tower or at the blades. In this respect it is mentioned that the described tower accelerations may be caused by wind generated oscillations of the tower or of the blades. These oscillations may have a significant amplitude in particular if the driving wind force causes oscillations or vibrations with a frequency being close to the resonance frequency of the nacelle and the rotor or of the blades being mounted on top of the resilient tower. Since the appropriate sensors are state of the art, for the sake of conciseness no further details about the functionality of such sensors are given in this patent application.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects are apparent from the example of embodiment to be described hereinafter and are explained with reference to the example of embodiment. The invention will be described in more detail hereinafter with reference to an example of embodiment but to which the invention is not limited.

BRIEF DESCRIPTION OF THE DRAWINGS

FIG. 2 schematically shows a control scheme based on reducing the power output of a wind turbine.

FIG. 3 schematically shows a control scheme according to an exemplary embodiment based on not reducing the power output of a wind turbine.

DETAILED DESCRIPTION

Figure 1:
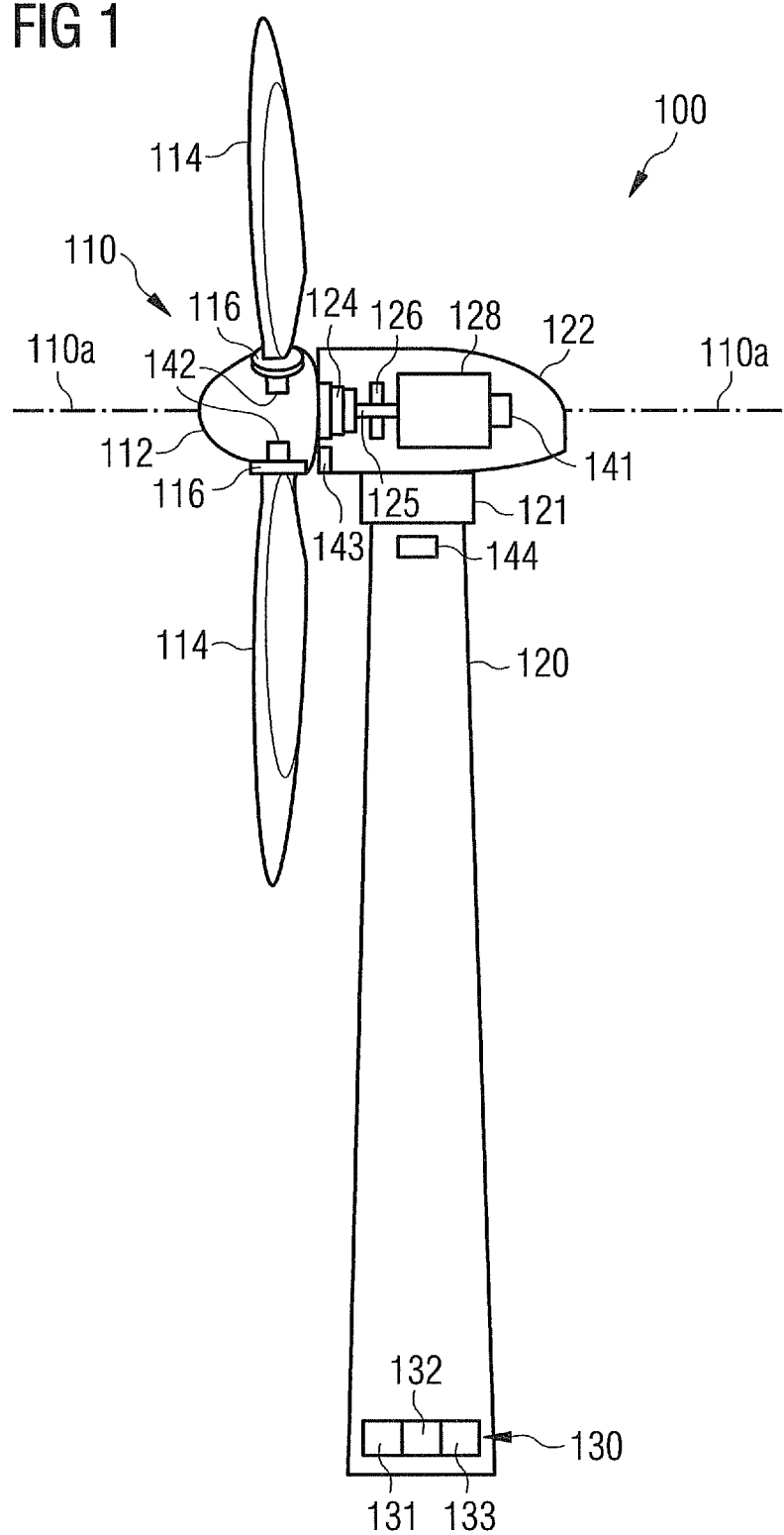
FIG. 1 schematically shows a wind turbine comprising a control system for reducing vibrations of blades of the wind turbine.

The illustration in the drawing is schematically. It is noted that in different figures, similar or identical elements are provided with the same reference signs or with reference signs, which are different from the corresponding reference signs only within the first digit.

FIG. 1 schematically shows a wind turbine 100. The wind turbine 100 comprises a tower 120, which is mounted on a non-depicted fundament. On top of the tower 120 there is arranged a housing 122. In between the tower 120 and the housing there is provided a yaw angle adjustment device 121, which is capable of rotating the housing 122 around a non depicted vertical axis, which is aligned with the longitudinal extension of the tower 120. By controlling the rotor angle adjustment device 121 in an appropriate manner it can be made sure, that during operation of the wind turbine 100 the housing 122 is always properly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a driving collar 112, extend radial with respect to the rotational axis 110a.

In between the driving collar 112 and a blade 114 there is respectively provided a blade adjustment device 116 in order to adjust the blade pitch angle of each blade 114 by rotating the respective blade 114 around a non depicted axis being aligned parallel with the longitudinal extension of the blade 114. By controlling the blade adjustment device 116 the blade pitch angle of the respective blade 114 can be adjusted in such a manner, that depending on the current wind conditions a maximum wind power can be retrieved from the available wind power.

As can be seen from FIG. 1, within the housing there is provided a gear box 124. The gear box is used to convert the number of revolutions of the rotor 110 into a higher number of revolutions of a shaft 125, which is coupled in a known manner to a generator 128. Further, a brake 126 is provided in order to stop the operation of the wind turbine 100 for instance in case of an emergency and/or in case of strong wind conditions, which might harm the wind turbine 100.

The wind turbine 100 further comprises a control system 130 for operating the wind turbine 100 in a highly efficient manner, e.g. by adjusting set points of operation parameters. Apart from controlling for instance the rotor angle adjustment device 121 the depicted control system 130 may also be used for adjusting the blade pitch angle of the rotor blades 114 in an optimized manner.

The control system 130 may also used for estimating the effective wind direction of wind, which is driving the rotor 110. Therefore, the control system 130 comprises a determination unit 131 for determining the values of at least two parameters being indicative for an operating condition of the wind turbine 100. In particular, the determination unit may be adapted to determine whether measured values of parameters, e.g. vibrations or G-forces, are above or below a predetermined threshold. The predetermined threshold may be chosen or determined in such a way that the risk or danger of damaging the wind turbine or any part of it due to vibrations may be at an acceptable level.

Several parameters may be indicative for the operating condition of the wind turbine 100 used. In the following four parameters will be described in more detail:

A first parameter may be indicative for the wind induced movement of the tower 120, the blades or the generator shaft. Typically, this movement exhibits an oscillating character and comprises time dependent accelerations. According to the embodiment described here, the value of this first parameter is measured by one or more acceleration sensors 144 which may be fixed to the tower 120 and/or to the blades 114, e.g. for measuring or monitoring edgewise blade vibrations. These acceleration sensors may be capable of measuring (a) accelerations components being oriented perpendicular to the wind direction and (b) accelerations components being oriented parallel to the wind direction.

A second parameter may be the rotational speed of the rotor 110 and/or the turbine or generator shaft. The control system 130 may acquire the value of the second parameter from a rotational speed sensor 143, which may be connected to the gear box 124.

A third parameter may be the actual power production of the wind turbine 110. The control system 130 may acquire the value of the third parameter from a power sensor 141. The power sensor 141 may be connected to the generator 128.

A fourth parameter may be the blade pitch angle of the blade 114. The control system 130 may acquire the value of the fourth parameter from angle sensors 142 which may be connected to the respective blade adjustment device 116.

FIG. 2 shows a control scheme based on reducing the power output of a wind turbine which is shortly described for illustrative purposes.

During the operation of the wind turbine edgewise vibrations may occur which may be monitored by a G-sensor. These vibrations normally build up over time, and when they reach a critical level a monitoring system will start altering the turbines set point. By changing the turbines set point it is possible to reduce the edgewise vibrations or the turbine will stop at the cost of active power production.

The set point for existing systems may alter the power reference by lowering it according to how much the edgewise vibration is exceeding a threshold. By decreasing the power reference it will cause the generator speed to rise until the pitch angle is increased enough to reduce it again. An example of the known scheme is schematically shown in FIG. 2. In particular, the upper most portion, FIG. 2A, shows the edgewise vibration amplitude 250 which exceed the predetermined threshold 251 at about 22:17:30. In the given example, the threshold value for the edgewise vibration amplitude is selected to be about 300 which corresponds to about 1.5 g. A value of about 450 would correspond to an acceleration force of about 2 g which should be avoided, since at such an acceleration force may damage the structure of the blades and/or the whole turbine may become possible. Instead of using an absolute threshold value of 300 for example, a relative value may be selected corresponding to a given maximal load, e.g. 2 g or the respective value of the given structure. Thus, a threshold value of 300 would correspond to 66% in case the given maximum edgewise vibration amplitude is 450, which correspond to a maximum load of 2 g. The next graph FIG. 2B shows the active power output 252 by the wind turbine. In order to reduce the vibrations shown in FIG. 2A the active power output is regulated down after the predetermined threshold has been reached. Consequently the moment induced into the wind turbine by the wind will cause the generator speed to increase which is illustrated in FIG. 2C which shows a clear rise in the rotational speed of the generator 253 about the same time the power output is reduced. FIG. 2D additionally shows the setting of the power reference in % 254 the course of which of course corresponds to the FIG. 2B. As can be seen in FIG. 2B and FIG. 2D the power output is significantly reduced. In reaction to the increase of the rotational speed of the generator the pitch angle is increased as well in order to reduce the moment induced by the wind into the blades. The course of the pitch angle 255 is shown in FIG. 2E.

FIG. 3 shows a control scheme according to an exemplary embodiment based on not reducing the power output but increasing the power output of a wind turbine. The different portions of FIG. 3 show the course of the corresponding parameters as depicted in FIG. 2 when a different control scheme is used which does not reduce the power output in order to reduce vibrations of the blades of a wind turbine.

In particular, in FIG. 3 a schematically example of the inventive control scheme is shown. In particular, the upper most portion, FIG. 3A, shows the edgewise vibration amplitude 350 which exceed the predetermined threshold 351 at about 12:53:11. The next graph FIG. 3B shows the active power output 352 by the wind turbine. In order to reduce the vibrations shown in FIG. 3A the active power output is regulated up after the predetermined threshold has been reached. This can be slightly seen at that point in time in FIG. 3B but can be seen more pronounced in the graph of FIG. 3D which shows the set reference value for the generator speed 356 which is decreased at about 12:53:12 in order to reduce the vibration the course of which is shown in FIG. 3A. Consequently the generator speed 353 will decrease as shown in FIG. 3C, while the generated power output 352 shown in FIG. 3B increases at the same time, since some of the rotational energy is converted into electrical power output. Additionally, the pitch angle shown in FIG. 3E is regulated in order to achieve a new equilibrium between energy or momentum inputted by the wind into the wind turbine and the electrical power outputted by the wind turbine.

Summarizing, a method or control scheme may be provided which involves the altering of set points to remove the vibration, but instead of reducing the power output, as in known methods, it is increased, which may result in more overall power production than the previous solution when handling vibrations. The power output is connected to the torque of the main shaft as well as to the rotational speed. By changing the set point of the turbine all of these affects has to be accounted for. This also allows multiple options of controlling how to increase the power output.

An exemplary method could be to increase the power output when a vibration reaches a certain level, and to lower the generator RPM of the turbine. This may cause a peak in power production, e.g. shown in FIG. 3B, since more torque is generated to slow down the turbine by drawing additional power. The pitch angle could also be combined with this method to more quickly slow down the generator RPM, by adding a small offset to the pitch angle at high vibrations.

A different method may be to combine more of the turbine's set points to be dependent on each other. For example if the generator speed is above a predetermined threshold when a high vibration occurs, the generator speed reference may be lowered to remove the vibration. But if the generator speed is below a predetermined threshold when a high vibration occurs the pitch angle may be increased and/or the power may be ramped dawn.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for reducing vibrations of a wind turbine with a plurality of set point values, each of the plurality of set point values characterizes an operation parameter of the wind turbine, the method comprising:
   measuring an acceleration force value corresponding to acceleration forces acting on the wind turbine;
   determining whether the measured acceleration force value is above a predetermined threshold value; and,
   when the acceleration force value is above the predetermined threshold value, modifying at least one of the plurality of set point values to reduce the vibrations such that a power output of the wind turbine is increased.

2. The method according to claim 1,
   wherein the at least one of the modified set point values includes a set point value of the power output.

3. The method according to claim 1,
   wherein the at least one of the plurality of set point values modified includes a set point value selected from the group consisting of:
   a pitch angle,
   a rotational speed of the generator,
   a rotational speed of the blades,
   a torque, and
   the power output of the wind turbine.

4. A control system for reducing vibrations of a wind turbine, comprising:
   a measuring unit for measuring an acceleration force value corresponding to acceleration forces acting on the wind turbine;

a determining unit for determining whether the measured acceleration force value is above a predetermined threshold value; and a control unit for modifying at least one of the plurality of set point values when the acceleration force value is above the predetermined threshold value, wherein the modifying is performed such that vibrations are reduced while a power output of the wind turbine is increased.

5. The control system according to claim 4, wherein the at least one of the plurality of the set point values modified includes a set point value of the power output.

6. The control system according to claim 4, wherein the at least one of the plurality of set point values modified includes a set point value selected from the group consisting of:
- a pitch angle,
- a rotational speed of the generator,
- a rotational speed of the blades,
- a torque, and
- the power output of the wind turbine.

7. A wind turbine for generating electric power, comprising:
- a tower;
- a rotor, which is arranged at a top portion of the tower and which comprises at least one blade, wherein the rotor is rotatable around a rotational axis, and the at least one blade extends radial with respect to the rotational axis;
- a generator mechanically coupled to the rotor; and
- a control system, the control system comprising:
  - a measuring unit for measuring an acceleration force value corresponding to acceleration forces acting on the wind turbine;
  - a determining unit for determining whether the measured acceleration force value is above a predetermined threshold value; and
  - a control unit for modifying the set point value of at least one set point of the plurality of set points when the acceleration force value is above the predetermined threshold value, wherein the modifying is performed such that vibrations are reduced while a power output of the wind turbine is not reduced; and
- a frequency converter adapted to be controlled by the control system in order to increase the power output of the wind turbine.

* * * * *